US011200804B2

(12) United States Patent
Lauber et al.

(10) Patent No.: US 11,200,804 B2
(45) Date of Patent: Dec. 14, 2021

(54) METHOD, DEVICE, COMPUTER PROGRAM AND COMPUTER PROGRAM PRODUCT FOR OPERATING A DISPLAY UNIT IN A VEHICLE

(71) Applicant: Bayerische Motoren Werke Aktiengesellschaft, Munich (DE)

(72) Inventors: Felix Lauber, Munich (DE); Simon Mansfeld, Munich (DE); Andreas Von Eichhorn, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 57 days.

(21) Appl. No.: 16/827,141

(22) Filed: Mar. 23, 2020

(65) Prior Publication Data
US 2020/0219394 A1    Jul. 9, 2020

Related U.S. Application Data

(63) Continuation of application No. PCT/EP2018/065670, filed on Jun. 13, 2018.

(30) Foreign Application Priority Data

Oct. 24, 2017  (DE) .................... 10 2017 218 921.5

(51) Int. Cl.
*G08G 1/00* (2006.01)
*G08G 1/14* (2006.01)
*G06K 9/00* (2006.01)

(52) U.S. Cl.
CPC ......... *G08G 1/143* (2013.01); *G06K 9/00812* (2013.01)

(58) Field of Classification Search
CPC ...... G08G 1/143; G08G 1/168; B62D 15/027; G06K 9/00812
See application file for complete search history.

(56) References Cited

U.S. PATENT DOCUMENTS

2007/0088474 A1* 4/2007 Sugiura ................ B60R 1/00
                                                      701/36
2011/0025483 A1   2/2011 Yano et al.
(Continued)

FOREIGN PATENT DOCUMENTS

DE   10 2010 051 206 A1   5/2012
DE   10 2012 007 984 A1   3/2013
(Continued)

OTHER PUBLICATIONS

International Search Report (PCT/ISA/210) issued in PCT Application No. PCT/EP2018/065670 dated Sep. 24, 2018 with English translation (five (5) pages).

(Continued)

*Primary Examiner* — Ojiako K Nwugo
(74) *Attorney, Agent, or Firm* — Crowell & Moring LLP

(57) ABSTRACT

A method for operating a display unit in a vehicle includes detecting a parking space and collision obstacles. The collision obstacles are obstacles located in the vicinity of the vehicle and/or the parking space. A relative position of the vehicle to the parking space is determined. A control signal is generated to generate an image on the display unit according to the relative position of the vehicle to the parking space. The image comprises a virtual vehicle, a virtual parking space and schematic elements. The virtual vehicle is a schematic representation of the vehicle. The virtual parking space is a schematic representation of the parking space. The schematic elements are a schematic representation of the collision obstacles.

19 Claims, 3 Drawing Sheets

(56) References Cited

U.S. PATENT DOCUMENTS

| | | | |
|---|---|---|---|
| 2013/0229524 A1 | 9/2013 | Vovkushevsky et al. | |
| 2014/0160275 A1* | 6/2014 | Sakakibara | B60R 1/00 348/118 |
| 2017/0036695 A1* | 2/2017 | Lee | B62D 15/027 |
| 2018/0099661 A1* | 4/2018 | Bae | B60W 30/06 |
| 2018/0322349 A1* | 11/2018 | Hayakawa | B60R 21/00 |
| 2019/0054927 A1* | 2/2019 | Hayakawa | G08G 1/14 |
| 2019/0100147 A1* | 4/2019 | Fang | G01C 21/3647 |
| 2019/0135342 A1* | 5/2019 | Inoue | B62D 15/027 |
| 2019/0232953 A1* | 8/2019 | Suzuki | B60W 30/06 |

FOREIGN PATENT DOCUMENTS

| | | |
|---|---|---|
| DE | 10 2012 014 207 A1 | 1/2014 |
| DE | 10 2015 002 438 A1 | 9/2016 |
| EP | 1 038 734 A1 | 9/2000 |
| JP | 2011-66657 A | 3/2011 |

OTHER PUBLICATIONS

German-language Written Opinion (PCT/ISA/237) issued in PCT Application No. PCT/EP2018/065670 dated Sep. 24, 2018 (six (6) pages).

German-language Office Action issued in German Application No. 10 2017 218 921.5 dated Apr. 9, 2018 (10 pages).

\* cited by examiner

METHOD, DEVICE, COMPUTER PROGRAM AND COMPUTER PROGRAM PRODUCT FOR OPERATING A DISPLAY UNIT IN A VEHICLE

CROSS REFERENCE TO RELATED APPLICATIONS

This application is a continuation of PCT International Application No. PCT/EP2018/065670, filed Jun. 13, 2018, which claims priority under 35 U.S.C. § 119 from German Patent Application No. 10 2017 218 921.5, filed Oct. 24, 2017, the entire disclosures of which are herein expressly incorporated by reference.

BACKGROUND AND SUMMARY OF THE INVENTION

The disclosed subject matter relates to a method, to a device, to a computer program and to a computer program product for operating a display unit of a vehicle, in which a schematic depiction for viewing a parking space is created depending on a relative position of the vehicle with respect to the parking space.

Parking assistance systems make it easier for the driver to park the vehicle. Camera-based systems make it possible to view the surroundings of the vehicle during parking, for example, by way of reverse cameras or a bird's-eye view (for example, Surround View from BMW).

The disclosed subject matter provides a method for operating a display unit of a vehicle and a corresponding device, a computer program, and a computer program product that contributes to enabling comprehensible and reliable viewing of a parking space for a driver.

The disclosed subject matter relates to a method for operating a display unit of a vehicle. In the method, a parking space and collision obstacles are detected, wherein the collision obstacles are obstacles that are located in the vicinity of the vehicle and/or of the parking space. A relative position of the vehicle with respect to the parking space is determined. A control signal is generated in order to generate an image on the display unit, specifically depending on the relative position of the vehicle with respect to the parking space, wherein the image comprises a virtual vehicle, a virtual parking space, and schematic elements, wherein the virtual vehicle represents a schematic depiction of the vehicle, the virtual parking space represents a schematic depiction of the parking space and the schematic elements represent a schematic depiction of the collision obstacles.

Vehicle sensors may, for example, be used to detect parking spaces and possible collision obstacles in the vicinity of the vehicle. The control signal for generating the image may be generated, for example, automatically when the parking space is detected. Generating the control signal depending on the relative position of the vehicle with respect to the parking space makes it possible to generate an image in which a virtual vehicle and a virtual parking space are able to be depicted completely. The image represents a schematic depiction that consists of three elements, the virtual vehicle, the virtual parking space and the schematic elements, wherein the schematic elements, for example, represent possible collision obstacles detected by vehicle sensors.

The virtual parking space may, for example, be viewed as an overlay above a background of the screen, wherein the background of the image is constructed by the schematic elements. The schematic depiction allows the parking space to be viewed easily and intuitively by the driver.

Using the schematic depiction to view the parking space allows a distortion-free depiction of a larger region of the surroundings of the vehicle than in the case of systems with a camera-based bird's-eye view (for example, Surround View from BMW). The parking space is able to be displayed with the undistorted size and at the undistorted position. The schematic depiction does not require any technically complex three-dimensional reconstruction of the surroundings of the vehicle. The schematic depiction makes it possible, for example, to view the parking space even when the view thereof from the perspective of a camera is blocked by obstacles.

By way of the schematic depiction, it is possible to provide important information regarding the parking process to the driver without the driver being distracted or overloaded with a barrage of unnecessary information.

In an embodiment, the relative position of the vehicle with respect to the parking space is determined continuously. The control signal for generating the image is adjusted depending on the determined relative position of the vehicle with respect to the parking space.

The control signal for generating the virtual image is adjusted dynamically in order to display the complete virtual parking space and the virtual vehicle while the vehicle is moving. This makes it possible for the driver to clearly view the virtual parking space and the virtual vehicle while the vehicle is moving.

In an embodiment, the continuously determined relative position of the vehicle with respect to the parking space is compared with a predefined first threshold value. The control signal is generated such that, in a first state, in which the vehicle is at a distance from the parking space that is greater than the predefined first threshold value, the virtual vehicle, the virtual parking space, and the schematic elements are depicted smaller in the image than in a second state. In the second state, in which the vehicle is at a distance from the parking space that is smaller than the predefined first threshold value, the virtual vehicle, the virtual parking space and the schematic elements are depicted larger in the image than in the first state. The virtual vehicle and the virtual parking space are depicted completely in the image.

An option is provided to switch to a zoomed-in image when the vehicle approaches the parking space, in which the virtual vehicle, the virtual parking space, and the schematic elements are depicted larger than in a zoomed-out image. This option allows the driver to better view the parking maneuver and makes it easier to control the parking procedure. If the vehicle moves away from the parking space, the control signal is generated such that the zoomed-out image is generated, in which the virtual vehicle, the virtual parking space and the schematic elements are depicted smaller than in the zoomed-in image. This allows the driver to better view the surroundings of the vehicle. Switching between a zoomed-out image and a zoomed-in image has the advantage of a stable depiction of the parking procedure for the driver.

In an embodiment, the control signal is adjusted continuously depending on the relative position of the vehicle with respect to the parking space. Continuously adjusting the control signal depending on the relative position of the vehicle with respect to the parking space has the advantage that the virtual image is adjusted continuously while the vehicle is moving. In this way, a dynamic depiction of the parking procedure is displayed to the driver. This means that the size of the virtual vehicle, of the virtual parking space, and of the schematic elements is adjusted dynamically depending on the relative position of the vehicle with respect to the parking space.

For a better depiction of the parking procedure, it is possible, for example, for the control signal to be generated such that a zoomed-out image and a zoomed-in image are generated. The zoomed-out image and/or the zoomed-in image are adjusted continuously depending on the relative position of the vehicle with respect to the parking space.

If the vehicle, for example, moves in the direction of the parking space in order to park, the relative distance of the vehicle with respect to the parking space becomes smaller. The control signal may be adjusted continuously such that the virtual vehicle and the virtual parking space are depicted larger in the image. This allows the driver to clearly view the virtual parking space and the virtual vehicle. If the vehicle, for example, moves away from the parking space, the relative distance of the vehicle with respect to the parking space becomes greater. The control signal may then be adjusted continuously such that the virtual vehicle and the virtual parking space are depicted smaller in the image. This allows the driver to clearly view the surroundings of the vehicle. Completely depicting the virtual vehicle and the virtual parking space in the image while the vehicle is moving makes it easier for the driver to control the parking procedure.

In a further advantageous refinement according to the first aspect, the continuously determined relative position of the vehicle with respect to the parking space is compared with a predefined second threshold value that is smaller than the predefined first threshold value, and the control signal is generated such that, in the case of a relative position of the vehicle with respect to the parking space that represents a distance of the vehicle with respect to the parking space that is smaller than the predefined second threshold value, the control signal is generated such that a bird's-eye view of the vehicle based on a camera image is displayed in the image.

If the vehicle, for example, approaches the parking space in order to park, a bird's-eye view based on a camera image may be displayed automatically in the image instead of the schematic depiction. The bird's-eye view based on a camera image, which may also be referred to as a top view, may represent a bird's-eye view image from above onto the vehicle. There may be a plurality of wide-angle cameras on the vehicle, and the images from the wide-angle cameras are depicted in a digitally coupled manner. The bird's-eye view, based on a camera image, may depict the surroundings in the immediate vicinity of the vehicle in undistorted form.

In an embodiment, at least one further parking space is detected. The further parking space is another parking space that is located in the vicinity of the vehicle. A relative position of the vehicle with respect to the further parking space is determined. The control signal is generated depending on the relative position of the vehicle with respect to the further parking space.

If a plurality of parking spaces are detected in the vicinity of the vehicle by way of the vehicle sensors, the control signal for generating the image may be generated such that all of the detected parking spaces are depicted completely in the image. This makes it easier for the driver to select an appropriate parking space.

In an embodiment, a relative position of the vehicle with respect to the collision obstacles is determined. The control signal is generated such that a color of the schematic elements is displayed in the image depending on the relative position of the vehicle with respect to the collision obstacles.

The possible collision obstacles detected by the vehicle sensors may have different colors depending on their distance from the vehicle. By way of example, the control signal for generating the image may be generated such that obstacles that are located far away from the vehicle are depicted in gray. Obstacles that are located in the vicinity of the vehicle may, for example, be depicted in green, yellow or red. The schematic depiction that is generated may thereby be intuitively comprehensible to the driver.

In an embodiment, the control signal is generated such that possible parking maneuvers are displayed to the driver for selection. The vehicle is parked automatically depending on a detected selection from the driver.

Displaying various possible parking maneuvers makes it easier for the driver to select an appropriate parking maneuver. The preselected parking maneuver may be depicted in highlighted form depending on a previous selection of the driver. The preselected parking maneuver is selected depending on a confirmation of the previous selection by the driver, and the vehicle is parked automatically.

The disclosed subject matter also relates to a device for operating a display unit of a vehicle. The device is designed to perform the method as previously discussed. The device comprises, for example, a data processing device.

The disclosed subject matter also relates to a computer program for operating a display unit of a vehicle. The computer program is designed to perform the method as previously discussed.

The disclosed subject matter also relates to a computer program product comprising executable program code, wherein the program code performs the method as previously discussed when it is executed by a data processing device.

The computer program product comprises a non-transitory medium able to be read by the data processing device and on which the program code is stored.

Other objects, advantages and novel features of the present invention will become apparent from the following detailed description of one or more preferred embodiments when considered in conjunction with the accompanying drawings.

Elements having the same structure or function are denoted by the same reference signs throughout the figures.

DETAILED DESCRIPTION OF THE DRAWINGS

Figure 1:
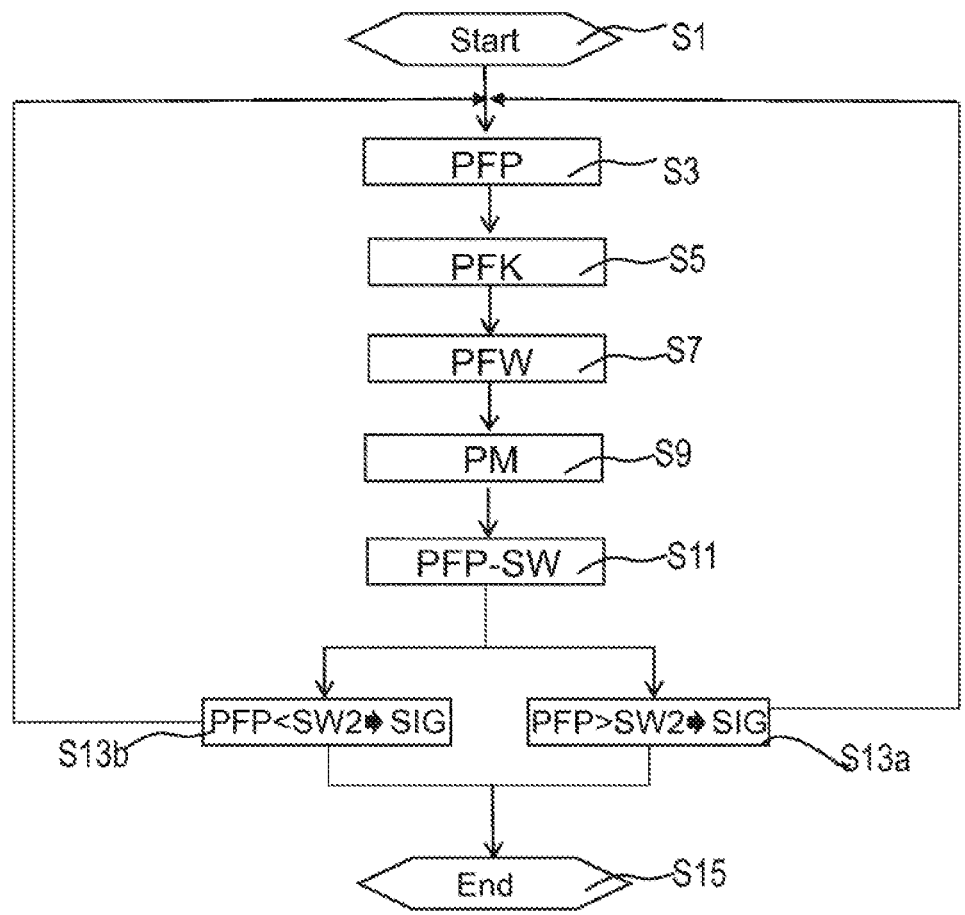
FIG. 1 shows a flowchart of a program for operating a display unit of a vehicle.

FIG. 1 shows a flowchart of a program for operating a display unit of a vehicle.

A device is designed, for example, to execute the program. For this purpose, the device has in particular a computing unit, a program and data memory, and for example, one or more communication interfaces. The program and data memory and/or the computing unit and/or the communication interfaces may be formed in one structural unit and/or distributed over a plurality of structural units.

The device may also be referred to as a device for operating a display unit of a vehicle. The device is, for example, coupled to the display unit in terms of signaling in order to transmit and receive data.

As an alternative or in addition, the device is formed in a backend and/or in a vehicle and/or in a mobile unit, such as a smartphone.

The display unit is integrated, for example, in the dashboard of the vehicle and/or a head-up display unit and/or a central display unit, for example, in the center console.

The program for operating a display unit of a vehicle is in particular stored on the program and data memory of the device.

The flowchart of FIG. 1 is explained in the following discussion.

The program is started in a step S1, in which for example, variables are initialized. The program is then continued in a step S3.

In step S3, a parking space that is located in the vicinity of the vehicle is detected, for example, by way of vehicle sensors. The parking space may be, for example, a perpendicular parking space or a parallel parking space. A relative position of the vehicle with respect to the parking space PFP is determined. The relative position of the vehicle with respect to the parking space PFP, for example, represents a distance of the vehicle with respect to the parking space. Collision obstacles are also detected, for example, by way of vehicle sensors, wherein the collision obstacles are obstacles that are located in the vicinity of the vehicle and/or of the parking space. The collision obstacles may be, for example, other vehicles and/or buildings and/or curbs. The program is then continued in an optional step S5.

In optional step S5, a relative position of the vehicle with respect to the collision obstacles PFK is determined. The program is then continued in an optional step S7.

In optional step S7, at least one further parking space is detected. The further parking space is another parking space that is located in the vicinity of the vehicle. A relative position of the vehicle with respect to the further parking space PFP is determined. The at least one further parking space may be detected, for example, by way of vehicle sensors. The program is then continued in an optional step S9.

In optional step S9, possible parking maneuvers PM for parking the vehicle are determined. The possible parking maneuvers PM may depend, for example, on the relative position of the vehicle with respect to the parking space PFP and/or the detected collision obstacles. The program is then continued in an optional step S11.

In optional step S11, the determined relative position of the vehicle with respect to the parking space PFP is compared with a predefined second threshold value SW2. The second threshold value SW2 is, for example, predefined such that it represents a minimum distance of the vehicle with respect to the parking space at which the parking space is able to be depicted without distortion by way of a camera image. If optional step S11 is not performed, the program is continued in a step S13a. If the determined relative position of the vehicle with respect to the parking space PFP is greater than the second threshold value SW2, the program is continued in step S13a. If the determined relative position of the vehicle with respect to the parking space PFP is smaller than the second threshold value SW2, the program is continued in step S13b.

Figure 2:
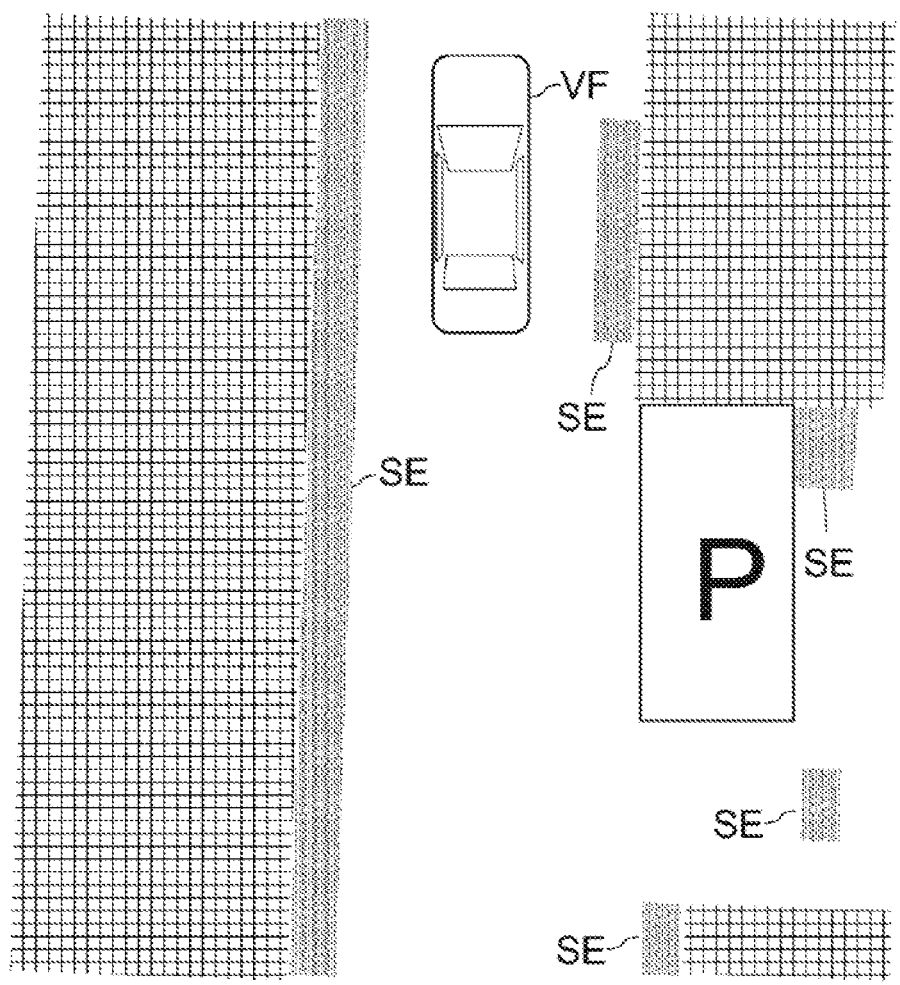
FIG. 2 shows an image in which a schematic depiction is displayed.

In step S13a, a control signal SIG for generating the image is generated depending on the determined relative position of the vehicle with respect to the parking space PFP. The image comprises a virtual vehicle VF, a virtual parking space P and schematic elements SE (see FIG. 2). The virtual vehicle VF represents a schematic depiction of the vehicle. The virtual parking space P represents a schematic depiction of the parking space. The schematic elements represent a schematic depiction of the collision obstacles. Depending on the relative position of the vehicle with respect to the parking space PFP, the control signal SIG for generating the image is generated, for example, such that the virtual vehicle VF and the virtual parking space P are displayed completely in the image. The control signal SIG for generating the image is, for example, generated such that a schematic depiction is displayed in the image, in which depiction the virtual vehicle VF, the virtual parking space P and the schematic elements SE are depicted. The control signal SIG for generating the image is, for example, generated such that the schematic depiction is displayed automatically in the image when the parking space is detected or upon the request of the driver.

By virtue of the schematic depiction, it is possible to depict a larger region in the surroundings of the vehicle without distortion than using a camera image. The schematic depiction allows the virtual parking space to be displayed to the driver at the undistorted position and with the undistorted size. Important information regarding the parking process, for example, the position of the parking space and collision obstacles, may be provided to the driver without said driver being distracted or overloaded with unnecessary information.

The schematic depiction allows reliable and comprehensible viewing of the parking space for the driver.

If optional step S5 is executed, the control signal SIG for generating the image is generated such that a color of the schematic elements is displayed in the image depending on the relative position of the vehicle with respect to the collision obstacles PFK.

Collision obstacles that are located, for example, far away from the vehicle may be depicted in gray in the image. Collision obstacles that are located, for example, in the vicinity of the vehicle may be depicted in green and/or yellow and/or red in the image depending on the relative position of the vehicle with respect to the collision obstacles PFK. The schematic depiction may thereby be intuitively comprehensible to the driver.

If optional step S7 is executed, the control signal SIG is generated depending on the relative position of the vehicle with respect to the further parking space PFW. The control signal SIG for generating the image is, for example, generated such that all of the detected parking spaces and the virtual vehicle VF are depicted completely in the image. Viewing parking spaces that are located in the vicinity of the vehicle makes it easier for the driver to select an appropriate parking space.

If optional step S9 is executed, the control signal SIG is generated such that possible parking maneuvers PM are displayed to the driver for selection. Displaying possible parking maneuvers PM makes it easier for the driver to select an appropriate parking maneuver. The vehicle may be parked automatically depending on a detected selection from the driver.

The program is then continued in step S3, for example, until the vehicle is parked. When the program is run through again, the control signal SIG may then be adjusted. The control signal SIG is, for example, adjusted such that, depending on the relative position of the vehicle with respect to the parking space PFP, either a zoomed-in image in which the virtual vehicle VF, the virtual parking space P and the schematic elements SE are depicted larger than in a zoomed-out image or the zoomed-out image is displayed. The option of switching between a zoomed-in image and a zoomed-out image allows a clear and stable depiction of the parking procedure for the driver.

As an alternative or in addition, the control signal SIG is adjusted continuously. This means that the size of the virtual vehicle VF, of the virtual parking space P, and of the schematic elements SE is adjusted continuously depending on the relative position of the vehicle with respect to the parking space PFP. Continuously adjusting the control signal SIG depending on the relative position of the vehicle with respect to the parking space PFP allows a comprehensible and dynamic depiction of the parking procedure for the driver. As an alternative, the program is ended in step S15 and may possibly be restarted in step S1.

Figure 3:
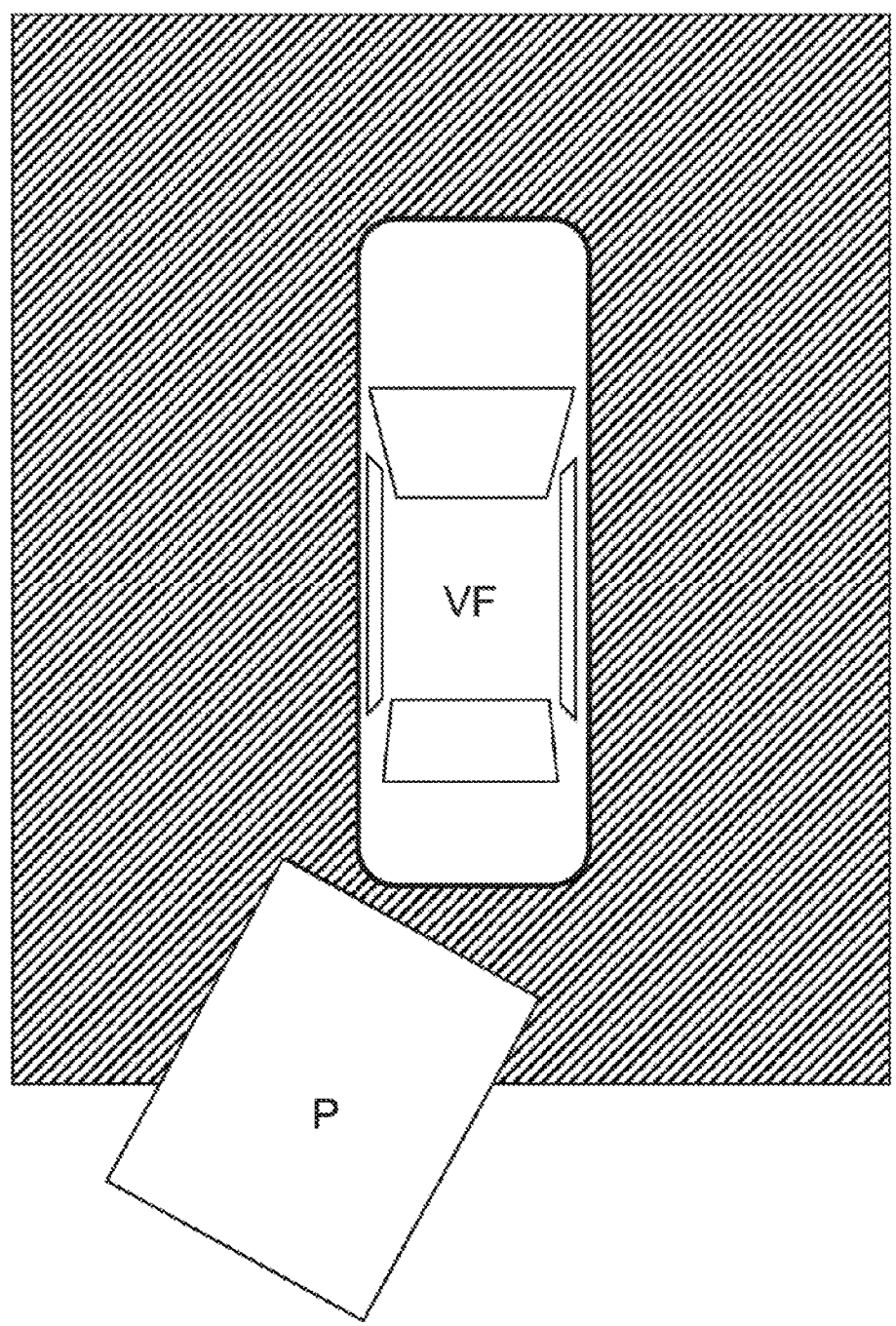
FIG. 3 shows an image in which a bird's-eye view based on a camera image is displayed.

In step 13b, the control signal SIG is generated such that a bird's-eye view of the vehicle based on a camera image is displayed in the image (see FIG. 3). The bird's-eye view based on a camera image comprises the virtual vehicle VF, the virtual parking space, and 2D surroundings of the vehicle. The 2D surroundings of the vehicle are displayed by a hatched region in FIG. 3. If the vehicle, for example, is being parked and approaches the parking space, the control signal SIG for generating the image may be generated such that the bird's-eye view based on a camera image is displayed in the image instead of the schematic depiction. The switch from the schematic depiction to the camera image may take place either automatically or upon request from the driver. The bird's-eye view based on a camera image, which may also be referred to as a top view, may represent an image from a bird's-eye view from above onto the vehicle. There are a plurality of wide-angle cameras on the vehicle, and the individual images from the wide-angle cameras are combined digitally to form a single contiguous plan view. The bird's-eye view based on a camera image may depict the surroundings in the immediate vicinity of the vehicle in undistorted form. If the vehicle is close enough to the parking space, a camera image may thus be used to view the surroundings of the vehicle without distortion. The camera image allows the driver to view the parking space in a manner close to reality.

If the vehicle, for example, moves away from the parking space, it is possible to switch back to the schematic depiction either automatically or upon request from the driver.

The program is then continued in step S3, for example, until the vehicle is parked. When the program is run though again, the control signal SIG may then be adjusted. The control signal SIG is, for example, adjusted such that the size of the virtual vehicle VF, of the virtual parking space P and of the schematic elements SE in the image is adjusted depending on the relative position of the vehicle with respect to the parking space.

As an alternative, the program is ended in a step S15 and may possibly be restarted in step S1.

LIST OF REFERENCE SIGNS

VF virtual vehicle
P virtual parking space
SE schematic elements
PFP relative position of the vehicle with respect to the parking space
PFW relative position of the vehicle with respect to the further parking space
PFK relative position of the vehicle with respect to the collision obstacles
SW1 first threshold value
SW2 second threshold value
PM possible parking maneuvers
SIG control signal The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a display unit of a vehicle, comprising:
   detecting a parking space and collision obstacles located in the vicinity of the vehicle and/or of the parking space;
   determining a relative position of the vehicle with respect to the parking space;
   generating a control signal to generate an image on the display unit depending on the relative position of the vehicle with respect to the parking space, the image comprising a virtual vehicle, a virtual parking space and schematic elements, wherein:
      the virtual vehicle represents a schematic depiction of the vehicle;
      the virtual parking space represents a schematic depiction of the parking space; and
      the schematic elements represent a schematic depiction of the collision obstacles;
   determining a relative position of the vehicle with respect to the collision obstacles; and
   displaying a color of the schematic elements in the image depending on the relative position of the vehicle with respect to the collision obstacles.

2. The method according to claim 1, wherein:
   the relative position of the vehicle with respect to the parking space is determined continuously; and
   the control signal for generating the image is adjusted depending on the determined relative position of the vehicle with respect to the parking space.

3. The method according to claim 2, further comprising:
   comparing the continuously determined relative position of the vehicle with respect to the parking space with a predefined first threshold value; and
   depicting the virtual vehicle and the virtual parking space completely in the image, wherein
      in a first state where the vehicle is at a distance from the parking space that is greater than the predefined first threshold value, the virtual vehicle, the virtual parking space, and the schematic elements are depicted smaller in the image than in a second state; and
      in the second state where the vehicle is at a distance from the parking space that is smaller than the predefined first threshold value, the virtual vehicle, the virtual parking space, and the schematic elements are depicted larger in the image than in the first state.

4. The method according to claim 2, further comprising:
   adjusting the control signal continuously depending on the relative position of the vehicle with respect to the parking space.

5. The method according to claim 2, further comprising:
   comparing the continuously determined relative position of the vehicle with respect to the parking space with a predefined second threshold value that is smaller than the predefined first threshold value; and
   displaying, based on a camera image, a bird's-eye view on the image, wherein a relative position of the vehicle with respect to the parking space that represents a distance of the vehicle with respect to the parking space is smaller than the predefined second threshold value.

6. The method according to claim 1, further comprising:
detecting at least one further parking space, the further parking located in the vicinity of the vehicle; and
determining a relative position of the vehicle with respect to the further parking space, wherein
the control signal is generated depending on the relative position of the vehicle with respect to the further parking space.

7. The method according to claim 1, further comprising:
displaying possible parking maneuvers for selection by the driver; and
parking the vehicle automatically depending on a detected selection from the driver.

8. A device for operating a display unit of a vehicle, wherein the device is configured to perform the method according to claim 1.

9. A system comprising:
a processor;
a memory in communication with the processor, the memory storing a plurality of instructions executable by the processor to cause the system to:
detect a parking space and collision obstacles located in the vicinity of the vehicle and/or of the parking space;
determine a relative position of the vehicle with respect to the parking space;
generate a control signal to generate an image on the display unit depending on the relative position of the vehicle with respect to the parking space, the image comprising a virtual vehicle, a virtual parking space and schematic elements, wherein:
the virtual vehicle represents a schematic depiction of the vehicle;
the virtual parking space represents a schematic depiction of the parking space; and
the schematic elements represent a schematic depiction of the collision obstacles;
detect at least one further parking space, the further the parking space located in the vicinity of the vehicle; and
determining a relative position of the vehicle with respect to the further parking space, wherein
the control signal is generated depending on the relative position of the vehicle with respect to the further parking space.

10. The system according to claim 9, wherein:
the relative position of the vehicle with respect to the parking space is determined continuously; and
the control signal for generating the image is adjusted depending on the determined relative position of the vehicle with respect to the parking space.

11. The system according to claim 10, further comprising instructions executable by the processor to cause the system to:
compare the continuously determined relative position of the vehicle with respect to the parking space with a predefined first threshold value; and
depict the virtual vehicle and the virtual parking space completely in the image, wherein
in a first state where the vehicle is at a distance from the parking space that is greater than the predefined first threshold value, the virtual vehicle, the virtual parking space, and the schematic elements are depicted smaller in the image than in a second state; and in the second state where the vehicle is at a distance from the parking space that is smaller than the predefined first threshold value, the virtual vehicle, the virtual parking space, and the schematic elements are depicted larger in the image than in the first state.

12. The system according to claim 10, further comprising instructions executable by the processor to cause the system to:
adjust the control signal continuously depending on the relative position of the vehicle with respect to the parking space.

13. The system according to claim 10, further comprising instructions executable by the processor to cause the system to:
compare the continuously determined relative position of the vehicle with respect to the parking space with a predefined second threshold value that is smaller than the predefined first threshold value; and
display, based on a camera image, a bird's-eye view on the image, wherein
a relative position of the vehicle with respect to the parking space that represents a distance of the vehicle with respect to the parking space is smaller than the predefined second threshold value.

14. The system according to claim 9, further comprising instructions executable by the processor to cause the system to:
determine a relative position of the vehicle with respect to the collision obstacles; and
display a color of the schematic elements in the image depending on the relative position of the vehicle with respect to the collision obstacles.

15. The system according to claim 9, further comprising instructions executable by the processor to cause the system to:
display possible parking maneuvers for selection by the driver; and
park the vehicle automatically depending on a detected selection from the driver.

16. A method for operating a display unit of a vehicle, comprising:
detecting a parking space and collision obstacles located in the vicinity of the vehicle and/or of the parking space;
determining a relative position of the vehicle with respect to the parking space;
generating a control signal to generate an image on the display unit depending on the relative position of the vehicle with respect to the parking space, the image comprising a virtual vehicle, a virtual parking space and schematic elements, wherein:
the virtual vehicle represents a schematic depiction of the vehicle;
the virtual parking space represents a schematic depiction of the parking space; and
the schematic elements represent a schematic depiction of the collision obstacles;
comparing the determined relative position of the vehicle with respect to the parking space with a predefined first threshold value; and
displaying, based on a camera image, a bird's-eye view on the image, wherein
a relative position of the vehicle with respect to the parking space that represents a distance of the vehicle with respect to the parking space is smaller than the predefined first threshold value.

17. The method according to claim 16, further comprising:
- detecting at least one further parking space, the further parking located in the vicinity of the vehicle; and
- determining a relative position of the vehicle with respect to the further parking space, wherein
    - the control signal is generated depending on the relative position of the vehicle with respect to the further parking space.

18. The method according to claim 16, further comprising:
- comparing the determined relative position of the vehicle with respect to the parking space with a predefined second threshold value, which is larger than the predefined first threshold value; and
- depicting the virtual vehicle and the virtual parking space completely in the image, wherein
    - in a first state where the vehicle is at a distance from the parking space that is greater than the predefined second threshold value, the virtual vehicle, the virtual parking space, and the schematic elements are depicted smaller in the image than in a second state; and
    - in the second state where the vehicle is at a distance from the parking space that is smaller than the predefined second threshold value, the virtual vehicle, the virtual parking space, and the schematic elements are depicted larger in the image than in the first state.

19. The method according to claim 16, wherein:
the relative position of the vehicle with respect to the parking space is determined continuously.

* * * * *